C. P. DYER.
NUT LOCK.
APPLICATION FILED SEPT. 26, 1912.
1,097,121.
Patented May 19, 1914.
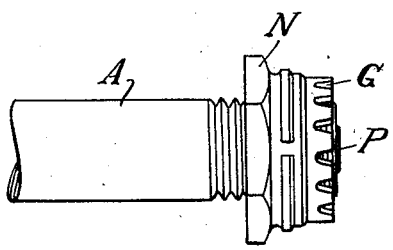
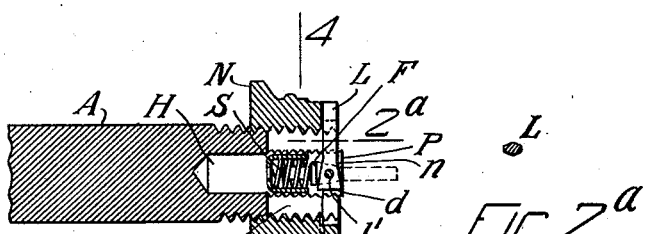
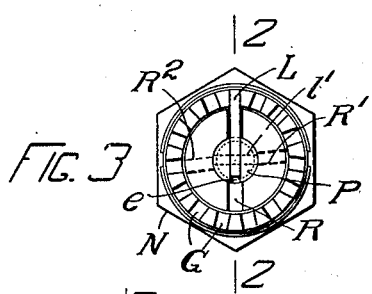
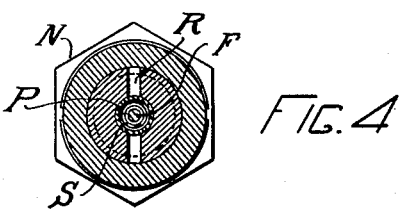
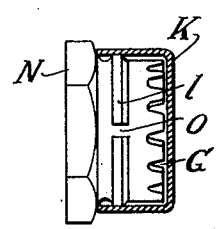
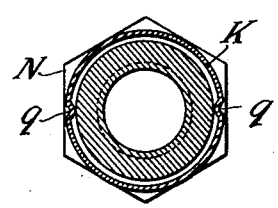
WITNESSES
O. T. Palmer
F. N. Kirschbaum
INVENTOR
Charles P. Dyer
by A. A. Spencer
Attorney
COLUMBIA PLANOGRAPH CO., WASHINGTON, D. C.

UNITED STATES PATENT OFFICE.

CHARLES P. DYER, OF SOMERVILLE, MASSACHUSETTS, ASSIGNOR TO MARINER S. FICKETT, OF CHELSEA, MASSACHUSETTS.

NUT-LOCK.

1,097,121. Specification of Letters Patent. Patented May 19, 1914.

Application filed September 26, 1912. Serial No. 722,424.

*To all whom it may concern:*

Be it known that I, CHARLES PARKER DYER, a citizen of the United States of America, and a resident of Somerville, in the county of Middlesex and Commonwealth of Massachusetts, have invented certain Improvements in Nut-Locks, of which the following is a specification.

This invention relates to improvements in means for locking the axle nuts of vehicles to the axles thereof, and consists in mechanism by which the maximum number of adjustments of the nut upon the axle may be effected by a minimum number of engaging devices for the locking means.

The mechanism and its operation will be readily understood from the description following, in connection with the accompanying drawings, wherein—

Figure 1 is a side elevation of the improved nut upon the end of a portion of an axle; Fig. 2 is a diametrical section of the same; Fig. 2ª, a transverse section of the locking lever; Fig. 3 is an elevation of the outer end of the nut and axle, viewed from the right in Fig. 1; Fig. 4 is a transverse section on line 4—4, Fig. 2; Fig. 5 is a side elevation of the nut, with a protecting cover thereon; Fig. 6 is a side elevation of the nut with the protecting cover in section; Fig. 7 is a transverse section of the nut and cover on line 7—7, Fig. 5.

A practical and convenient form of the embodiment of the invention is shown in the drawings and referring to the several parts illustrated by designating letters, A is the axle; N, the nut to be screwed upon the end thereof; H is a hole in the end of the axle with a plug P screwed into it. The plug has a chamber in its inner end containing a spring S, and a headed pin or follower F which it surrounds. After the follower and spring are inserted in the chamber the wall at its inner end is forced over the outer coil of the spring, thus holding it with the follower F securely in place. A diametrical slot $e$ is cut longitudinally into the outer end of the plug as far as the inner end of the chamber, so that the head of the follower F is flush with the bottom of the slot in which a cam-lever L is pivoted at $l'$. The portion of this lever which extends beyond the plug is preferably made in the shape of a double wedge, that is, beveled or chamfered off from the longitudinal median line to each edge, as illustrated in cross-section in Fig. 2ª. The inner end of the lever L is preferably cut as illustrated, at $m$, in a plane at right angles to the length of the lever, and the planes of the edges of the lever adjacent to this end, for a short distance toward its outer end, are inclined inward or toward the central line of the lever, as at $n$. This forms what may be designated a cam-lever, so that when the plane surface $m$ is in contact with the head of the follower F, the spring S will hold the lever in a position coincident with the axis of the axle and when the lever is tilted to one side or the other, the spring will yield and permit one of the cam projections $d$ of the lever to pass across the head of the follower, and then press the follower against the side of the projection $d$ thereby tending to force the outer end of the lever downward until it comes to a bearing on the outer end of the nut, or upon one of the inclined surfaces $n$. The inclined surfaces $n$ of the lever L will permit the outer end of the lever to tilt downward so as to engage the slots in the nut, even when it is below the surface of the outer end of the axle.

Radial slots R are cut in the end of the axle, into which the lever L may be tilted and at the same time into engagement with that one of the notches or slots G in the outer end of the nut N, which is in line with the slot R in the axle. The slots G are preferably made wedge-shape in cross-section, or more accurately a truncated wedge similar to the teeth of a beveled gear, so that when the lever L is tilted to a position to engage the slots in the nut it will be guided thereto and readily enter its inclined sides, which operation is also assisted by the beveled edges of the outer end of the lever L. With this construction even if the lever does not enter a slot to its full depth in the first instance, any jar to which the parts are subjected will tend to carry the lever farther into the slot by reason of the inclination of the contacting surfaces and the pressure of the spring upon the cam end of the lever L.

The diametrical slot R in full lines illustrated in Fig. 3 with fifteen slots in the end of the nut, and eighteen threads to the inch in the screw on the axle, is sufficient for ordinary practical purposes, as thirty adjustments of the nut in the direction of the axis of the axle can be made therewith for a complete rotation of the nut; that is, adjustments longitudinally of the axis of one five hundred and fortieth of an inch. If it is desired to make finer adjustments than this, additional radial slots may be made in the end of the axle as illustrated by dotted lines R', R², in Fig. 3, and in such a direction that when one end of the slot R registers with a notch in the nut as shown, and the other end of that slot is in line with a partition between two slots at the other side of the nut, the slot R' for example, will overlap one of said partitions by one half of its thickness, and the slot R² will overlap another of said partitions by one quarter of its thickness. With this construction it will be seen that by raising the lever L from the slot at the top of the figure, and turning the plug P until the lever will drop into the slot R', in the axle, it will require a rotary movement of the nut of only one half the thickness of a partition to bring the lever into position to engage a slot in the nut, and if the plug is turned until the lever L will drop into the slot R², it will require a rotary movement of the nut equal only to one quarter the thickness of the partition to place the lever over a slot in the nut. Thus the refinement of the adjustments of the nut upon the axle may be increased without increasing the number of slots in the outer end of the nut, the requisite being that the relative positions of the slots in the axle shall be such that no two of them will simultaneously register with two slots in the nut by any adjustment of the latter.

The slots R in the axle should be made deep enough to receive the lever L and permit it to engage the notches in the nut when the nut is screwed down to the full extent upon the axle: for example, of a depth substantially as illustrated in Fig. 2.

For the purpose of protecting the nut and locking devices from dust, moisture or casual injury, a cap or cover K may be placed over the end thereof and held in place by stamping a projecting nib $q$ in the cover, which will pass through a slot $o$ in an annular ridge $l$ upon the nut, and when the cap is in place a slight turn thereof will carry the nib beneath the ridge $l$ and secure the cap to the nut.

I claim:

1. A lock for the nut of a screw-threaded rod, consisting of a nut having a series of slots in its outer end extending radially to the axis thereof, a plurality of radial slots in the end of the rod, a chambered plug in the end of the rod adapted to turn concentrically thereto, a lever pivoted in the end of the plug and adapted by the adjustment of the plug to engage any slot in the rod and a coincident slot in the nut, and a spring in the chamber of the plug which tends constantly to hold the lever in such engagement.

2. In a nut-lock for an axle, a nut having a series of slots in its outer end extending radially to the axis thereof, a cam-lever pivoted in a radial slot at the outer end of the axle and adapted to be tilted into the slot in the axle and any slot in the nut in line therewith, which lever at its cam end, adjacent to the pivot, is provided, upon the edges which are at right angles to the plane in which it swings on its pivot, with surfaces inclined from that end toward the longitudinal center line of the lever, and a spring-actuated follower to bear upon such surfaces.

3. In a nut-lock for an axle, a nut having a series of slots extending radially to the axis thereof across its outer end, a longitudinally adjustable plug in the end of the axle, a cam-lever pivoted in the outer end of the plug, a diametrical slot in the end of the axle of a depth equal to the maximum longitudinal adjustment of the outer surface of the nut below the surface of the outer end of the axle, into which slot the lever is adapted to be tilted and to engage the slot in the nut which is in line with the slot in the axle, in any longitudinal adjustment of the plug, and a spring beneath the cam of the lever to hold the latter in its engagement with the nut.

4. In a nut-lock for an axle, a nut provided with a series of slots extending radially to the axis thereof in its outer end, a chambered plug longitudinally adjustable in the end of the axle and adapted to turn therein, a cam-lever pivoted in the outer end of the plug and adapted to be tilted in either direction to engage the slots in the nut, a spring in the chamber of the plug beneath the cam of the lever which tends to hold the latter in a position coincident with the axis of the axle and in its engagement with one of the slots in the nut.

5. In a nut-lock for an axle, a nut provided with a plurality of slots extending radially to the axis thereof in its outer end, a plurality of radial slots in the end of the axle located in such positions in relation to one another that no two of such slots will simultaneously register with two slots in the nut by any adjustment of the latter, and a locking lever connected at one end to the end of the axle and adapted to be rotated in its connection therewith and to be tilted into engagement with any slot in the axle and a slot in the nut which is in radial line with such slot in the axle.

6. In a nut-lock for a threaded member, a nut having a series of slots extending radially of the axis thereof across its outer end, a longitudinally adjustable hollow plug in the end of the threaded member, a lever pivoted in the outer end of the plug, said threaded member having a diametrical slot in the end thereof into which slot the lever is adapted to be tilted to engage the slot in the nut which is in line with the slot in the threaded member and a spring-pressed plunger located in the hollow plug and adapted to bear against the pivoted lever.

CHARLES P. DYER.

Witnesses:
GLADYS MUSGROVE,
EARLE W. EDWARDS.

Copies of this patent may be obtained for five cents each, by addressing the "Commissioner of Patents, Washington, D. C."